United States Patent
Vernon-Harcourt et al.

(10) Patent No.: US 11,498,259 B2
(45) Date of Patent: Nov. 15, 2022

(54) VOID VOLUME MEASUREMENT FOR A COMPOSITE PIPE

(71) Applicant: Magma Global Limited, Portsmouth (GB)

(72) Inventors: Edward William Vernon-Harcourt, Steyning (GB); Daniel Mark Maynard, Huntingdon (GB)

(73) Assignee: Magma Global Limited, Portsmouth (GB)

( * ) Notice: Subject to any disclaimer, the term of this patent is extended or adjusted under 35 U.S.C. 154(b) by 220 days.

(21) Appl. No.: 16/632,519

(22) PCT Filed: Jul. 19, 2018

(86) PCT No.: PCT/GB2018/052049
§ 371 (c)(1),
(2) Date: Jan. 20, 2020

(87) PCT Pub. No.: WO2019/016558
PCT Pub. Date: Jan. 24, 2019

(65) Prior Publication Data
US 2021/0162650 A1 Jun. 3, 2021

(30) Foreign Application Priority Data
Jul. 21, 2017 (GB) ..................................... 1711753

(51) Int. Cl.
*B29C 70/32* (2006.01)
*B29C 53/80* (2006.01)
(Continued)

(52) U.S. Cl.
CPC ........ *B29C 53/8041* (2013.01); *B29C 53/582* (2013.01); *B29C 53/607* (2013.01);
(Continued)

(58) Field of Classification Search
None
See application file for complete search history.

(56) References Cited

U.S. PATENT DOCUMENTS

| 5,301,610 A | 4/1994 | McConnell | |
|---|---|---|---|
| 6,605,171 B1 * | 8/2003 | Debalme | ............... B29C 70/382 156/169 |
| 2020/0031071 A1 * | 1/2020 | Al-Zubaidy | ............ B29C 53/60 |

FOREIGN PATENT DOCUMENTS

| CA | 2803568 A | * | 7/2013 |
|---|---|---|---|
| EP | 2 377 673 | | 10/2011 |

(Continued)

OTHER PUBLICATIONS

Mallick, P.K., "Fiber-Reinforced Composites: Materials, Manufacturing, and Design," Section 5.8, "Manufacturing Processes for Thermoplastic Matrix Composites," pp. 422-426 (3d ed. CRC Press, 2007).

*Primary Examiner* — Jeffry H Aftergut
(74) *Attorney, Agent, or Firm* — Levy & Grandinetti

(57) ABSTRACT

A method of determining a void volume during manufacture of a composite pipe formed of concentric layers of adjacently positioned, helical windings of composite tape has the steps of: (a) scanning the surface of a layer of adjacently positioned, helical windings to generate scanning information; (b) using the scanning information to locate gap(s) between adjacent windings and to determine the number of gaps and characteristic dimensions of each gap in the layer; and (c) generating a calculated void volume of the layer, using the number of gaps and the characteristic dimensions of each gap for the layer. The invention also relates to a corresponding apparatus for determining a void volume during manufacture of a composite pipe formed of concentric layers of helically wound composite tape.

20 Claims, 2 Drawing Sheets

(51) Int. Cl.
  *B29C 53/58* (2006.01)
  *B29C 53/60* (2006.01)
  *B29C 53/68* (2006.01)
  *B29C 53/82* (2006.01)
  *B29C 53/84* (2006.01)
  B29K 307/04 (2006.01)
  B29K 309/08 (2006.01)
  B29L 23/00 (2006.01)
  B29C 53/56 (2006.01)

(52) U.S. Cl.
  CPC ............ *B29C 53/68* (2013.01); *B29C 53/822* (2013.01); *B29C 53/825* (2013.01); *B29C 53/845* (2013.01); *B29C 70/326* (2013.01); B29C 53/56 (2013.01); B29C 53/58 (2013.01); B29K 2307/04 (2013.01); B29K 2309/08 (2013.01); B29L 2023/22 (2013.01)

(56) References Cited

FOREIGN PATENT DOCUMENTS

| | | |
|---|---|---|
| EP | 2 385 340 | 11/2011 |
| EP | 2639048 | 9/2013 |
| JP | S5565520 | 5/1980 |
| JP | 60-97179 | 5/1985 |
| JP | 61-123414 | 6/1986 |
| WO | WO 01/98032 | 12/2001 |
| WO | WO 2010/023754 | 3/2010 |
| WO | WO 2012/079993 | 6/2012 |
| WO | WO 2016/092270 | 6/2016 |

\* cited by examiner

VOID VOLUME MEASUREMENT FOR A COMPOSITE PIPE

FIELD OF THE INVENTION

The invention relates to a method and apparatus for making composite pipe.

DESCRIPTION OF THE RELATED ART

Subsea oil and gas drilling and development employs pipes to transport liquid and/or gaseous hydrocarbons from the seabed to the sea surface and to transport injection fluids from the surface to the seabed. Traditionally, these pipes have typically been made from steel or from combinations of materials, such as steel wires combined with a plastic liner, which together form a flexible steel pipe.

Over time, the subsea depths at which hydrocarbons are extracted has tended to increase. This development has been accompanied by a need to handle more aggressive fluids, higher operating pressures and harsher environmental conditions. Furthermore, in the case of very long pipes suitable to be used at large depths, the weight of the pipe itself becomes significant and may be a disadvantageous factor. In order to address these challenges, the industry has turned to composite pipes, comprising fibre-reinforced polymer. Reference may be made to WO 2012/079993 A1 which discloses such composite pipes. These pipes are typically lighter and better able to withstand the more severe environments as well as the more complex dynamic loading conditions including tension, bending and internal/external pressure found deep below the sea surface.

Composite pipe may advantageously be manufactured from tape(s) of thermoplastic polymer reinforced with fibres. Layers of these tapes are helically wound onto a cylinder, which is usually a pipe liner, but may instead be a mandrel, to form the composite pipe. During manufacturing, the layers of tape are fused to the underlying liner in the case of the first layer of windings, and then, in the case of subsequent windings, to the underlying tape, to create the pipe wall.

A challenge when winding composite tape(s) is to ensure that they are wound such that a winding exactly abuts adjacent tape winding(s) in order that there is no gap between windings and in order that adjacent windings do not overlap. Gaps typically give rise to voids in the finished product and voids are commonly understood to represent points of weakness, which may be a source of structural failure in use. Overlapping tapes cause surface irregularities which may also cause the creation of voids when further windings are applied over them. Furthermore, the fusing together of tapes requires the application of heat which may cause the pipe to expand or contract during manufacture. Such expansion/contraction may further affect the degree of separation of adjacent composite tape windings and give rise to voids. It is desirable to quantify the void volume of products in the present field. Being able to do so may facilitate improved quality control.

It is against this background that the present invention has been devised.

SUMMARY OF THE INVENTION

According to a first aspect of the invention, applicants provide a method of determining a void volume during manufacture of a composite pipe formed of concentric layers of adjacently positioned, helical windings of composite tape, comprising the steps of:
 a) scanning the surface of a layer of adjacently positioned, helical windings to generate scanning information;
 b) using the scanning information to locate gap(s) between adjacent windings and to determine the number of gaps and characteristic dimensions of each gap in the layer; and
 c) generating a calculated void volume of the layer, using the number of gaps and the characteristic dimensions of each gap for the layer.

Having used the scanning information to locate gap(s) between adjacent windings and to determine the number of gaps and characteristic dimensions of each gap, a calculated void volume for the layer may be generated in step c). The void volume for the layer is a summation of the individual gap volumes. In theory, there are other sources of voids in a pipe made of wound composite tape, such as blisters where there has been imperfect adhesion between concentric layers, but in practice, such alternative sources of voids have been found to be minimal in comparison with the gaps presently being discussed.

The void volume of a layer represents a quality control measure which is rapidly actionable by the operator of a manufacturing line for making composite pipe. It may be used quickly to alert the operator of a quality control problem or even to automatically stop production if a maximum acceptable void volume level is attained.

According to a further advantageous aspect of the invention, steps a) to c) are performed for every concentric layer of the composite pipe and the calculated void volumes of all layers are added together to generate a calculated void volume for the entire composite pipe.

The void volume may be presented in many forms, such as in the form of a percentage of the volume of the pipe material, although a skilled person is aware of other ways of presenting the information. Void volume information may be used to demonstrate improvements in quality over time and for other purposes understood by the skilled person.

The composite tape is a pre-formed tape comprising a thermoplastic polymer matrix within which are embedded reinforcing fibres. The width of the tape may be from 2 mm to 300 mm, but is typically from 6 mm to 36 mm, preferably from 12 mm to 24 mm; the thickness of the tape is typically from 0.05 mm to 1 mm, preferably from 0.1 mm to 0.8 mm.

The thermoplastic polymer matrix may comprise any suitable thermoplastic polymer, but advantageously comprises and more advantageously consists only of polyether ether ketone (PEEK). PEEK has the advantage of having good resistance acidic and saline environments as well as better stability at high temperatures than many other commercially available polymers. It also demonstrates low permeability to some gases present in subsea hydrocarbon deposits, such as hydrogen sulphide and carbon dioxide. Preventing gas permeation is advantageous, because permeating gases may force their way between concentric layers of the composite pipe, or inside the liner or the thermoplastic matrix, resulting in delamination, blistering and even failure.

The reinforcing fibres embedded in the thermoplastic polymer matrix advantageously comprise and more advantageously consist only of carbon fibres, glass fibres, or mixtures thereof. Advantageously, the fibres are aligned axially along the longitudinal axis of the tape. Preferably, the fibres are continuous fibres.

To make the pipes, composite tape(s) are helically wound around a cylinder to form a pipe comprising concentric layers of adjacently positioned, helically-wound tape(s). It is possible to manufacture a pipe using a single source of composite tape (that is, a single tape), but it is more efficient to provide two or more sources of tape and to wind them simultaneously, especially when manufacturing long pipes of hundreds or thousands of metres in length. The number of windings needed to form a concentric layer will depend upon the angle of winding, the diameter of the pipe and the width of the tape.

The windings of the composite tape are heated to melt and fuse them to the underlying surface, be it the pipe liner, in the case of the first concentric layer of tape, or the underlying concentric layer of composite tape, in the case of subsequent concentric layers of tape. Such heating is performed to one or both of the contact surfaces immediately prior to contact between the surfaces, in a manner known to the skilled person. Reference can be made to "Fiber Reinforced Composites, Materials, Manufacture and Design", $3^{rd}$ Edition, P. K. Mallick, 2008, The CRC Press, Section 5.8, "Manufacturing Processes for Thermoplastic Matrix Composites". Advantageously, only a thin layer at each surface is heated, since it is disadvantageous to melt the entire tape, as well as wasteful of energy. Melting a thermoplastic polymer may result in altered crystallinity during cooling which may affect properties, such the tape's fracture toughness.

The windings of any given concentric layer may be provided at the same angle or at a different angle to the windings of the immediately preceding concentric layer. The composite tape(s) are wound at an angle of between 15 degrees and 89 degrees to the pipe's longitudinal axis, with an angle from 30 degrees to 55 degrees being preferred to withstand tension and an angle from 55 degrees to 89 degrees being preferred to withstand radial pressure. The skilled person will select the winding angle(s) of the composite tape(s) and the winding angle of the tape(s) in each concentric layer to provide flexibility during handling and optimal mechanical properties in bending, tension, hoop stress and torsion. A composite pipe may comprise from tens to hundreds of concentric layers of composite tape The cylinder around which the tape(s) are initially wound is typically a pipe liner which forms part of the finished pipe, but it may instead be a mandrel which is subsequently removed and does not form part of the finished pipe. As winding progresses, the cylinder will be the pipe liner or the mandrel covered with underlying windings. The pipe liner may be formed of the same material or of a different material from the matrix of the composite tape. In one embodiment, the pipe liner comprises and it may consist only of the same material as the matrix of the composite tape. By using the same material, a strong bond between the liner layer and the composite layer may be ensured. The pipe liner advantageously comprises and more advantageously consists only of PEEK.

As already mentioned, an objective when winding composite tape(s) to form a composite pipe is to ensure that a tape is wound such that a winding exactly abuts adjacent winding(s) in order that there is no gap between windings and in order that adjacent windings do not overlap. In this fashion, each concentric layer should provide a complete covering of the underlying, immediately preceding concentric layer (or the pipe liner in the case of the first concentric layer). Perfectly abutting windings result in a surface which effectively has no gaps in it and thus no edges. If windings do not perfectly abut, such that there is a gap, then each gap will be defined by two edges. If a winding overlaps another winding, then there will be no gap, but a single raised edge will be presented.

The method according to the first aspect of the invention comprises the step a) of scanning the surface of a layer of adjacently positioned, helical windings to generate scanning information. The step of scanning may comprise an optical method, an electrical method, a magnetic method, a tactile method, an ultrasonic method, or a mixture thereof. The scanning information is used to determine wound composite tape edge positions.

According to one alternative embodiment, the optical method may comprise the steps of:
  projecting light onto the region of the pipe surface where tape edges are expected to be;
  gathering and recording optical information from light reflected by the region where wound tape edges are expected to be;
  wherein the optical information is the scanning information used to determine wound composite tape edge position(s).

The light may derive from a suitable source of visible light of known frequency distribution projected at a suitable angle to the pipe surface. The optical information gathered and recorded comprises light reflected from the pipe surface. The analysis of the reflected light may include identifying areas of contrast, especially areas of shadow, which are indicative of a change in surface level. Knowing the strength, frequency distribution and angle of the light source as well as the angle of curvature of the pipe, allows interpretation of the observed regions of shadow and a determination of the location of composite tape edges. Using that information, the numbers, locations and dimensions of the gaps between composite tapes, as well as the locations of composite tape overlaps may be determined in step b) of the first aspect of the invention. The detection and dimensioning of edges from digital images, for example, is known, so these matters are within the routine capabilities of a person skilled in this art.

According to one alternative, the light projected onto the region of the pipe surface where composite tape edges are expected to be is not provided by an additional light source, but is ambient light, such as the lighting provided on the production line for manufacture of the pipe.

According to a preferred alternative, the light projected onto the region of the pipe surface where composite tape edges are expected to be comprises laser light projected at a suitable angle(s) to the pipe surface. A laser profilometer, such as an "ZG2 Smart Sensor", manufactured by Omron Corporation of Kyoto, Japan, may be used.

According to another alternative, the optical method may comprise the step of
  providing the composite tape with a visible marker in step a), which marker may be used to determine composite tape edge positions;
  optionally providing additional illumination of visible marker(s);
  gathering and recording optical information from light reflected by the visible marker(s);
  wherein the optical information is the scanning information used to determine wound composite tape edge position(s).

The visible marker may be a line or some other mark provided during or after manufacture of the composite tape. The marker may be located at a composite tape edge or at some other location, such as the centre of the composite tape, provided that the distance from the marker to the composite tape edges is known. The number, location and dimensions of the gaps between composite tapes may then be determined may be determined in step b) of the first aspect of the invention.

In similar fashion, a wire or other electrically or magnetically detectable element may be incorporated into the composite tape during or after manufacture of the composite tape. The element may be located at a composite tape edge or at some other location, such as the centre of the composite tape, provided that the distance from the element to the composite tape edges is known. The number, location and dimensions of the gaps between composite tapes may then be determined may be determined in step b) of the first aspect of the invention.

In a further alternative, a tactile method, such as a stylus may be used to detect the location, number and size of gaps. In a further alternative still, ultrasound may be used to make such a determination.

Advantageously, according to the method of the first aspect of the invention, step a) is performed simultaneously at two axially identical and diametrically opposite locations (that is, separated by 180 degrees). This is done because the pipe may vibrate or otherwise move laterally during manufacturing, which may give rise to inaccurate scanning information. By scanning in the presently defined fashion, if the pipe moves away from one scanning device, then it moves towards the second scanning device, which cancelling out the movement in a first plane. Knowing the angle of curvature of the pipe allows for compensation for a plane at right angles to the first plane. According to the invention, step a) may be performed simultaneously at more than two axially identical and diametrically different locations to provide enhanced compensation for lateral movements of the pipe.

Typically, composite pipe is manufactured in a continuous fashion and winding is performed by one or more winding applicator(s), each of which is advantageously in the form of a rotating ring having one or more tape head(s) disposed thereon. The tape head or each tape head is adapted to receive a feed of and applying helical windings of composite tape. The pipe is conveyed through the rotating ring(s) and tape is helically wound onto the pipe via the tape head(s) on the ring or on each ring. Advantageously, there is more than one ring and, more advantageously, each ring comprises more than one tape head. Such an arrangement may allow the simultaneous application of multiple tapes and may be sufficient to manufacture a complete concentric layer in a single pass. In some cases, however, the pipe may need to be passed through the winding applicator(s) several times to complete a layer. The step of scanning the surface of each layer of adjacently positioned, helical windings to generate scanning information may be performed during rewinding.

According to a second aspect of the invention, an apparatus is provided for determining a void volume during manufacture of a composite pipe formed of concentric layers of helically wound composite tape, comprising:
  a) a scanning device adapted to scan the surface of a layer of adjacently positioned, helical windings to generate scanning information;
  b) a processor adapted to:
    a. use the scanning information to locate gap(s) between adjacent windings and to determine the number of gaps and characteristic dimensions of each gap in the layer;
    b. generate a calculated void volume of the layer, using the number of gaps and the characteristic dimensions of each gap for the layer.

According to a further advantageous aspect, the processor is additionally adapted to add together the calculated void volumes of all the layers to generate a calculated void volume for the entire composite pipe.

The scanning device according to the invention may be an optical scanner, an electrical scanner, a magnetic scanner, a tactile scanner, an ultrasonic scanner, or a mixture thereof.

Advantageously, the scanning device is an optical scanner, which comprises a visible light sensor for receiving reflected light from the pipe surface. The visible light sensor may be a charge-coupled device of the type used in digital cameras or some other light sensor known to the skilled person. The resolution of the camera is selected to be appropriate to the accuracy of edge location required. This is achieved with a high-resolution camera with optics suitable to image the region in which edges of the wound composite are expected to be, typically with a resolution an order of magnitude finer then the region, and a high sample rate, typically in excess of 100 images per second.

FIG. 2 is an example surface map of a pipe surface generated with a laser profile scanner, giving a three-dimensional image. Tape edges 11 can be seen as dark or light lines running from left to right in the image. The previous concentric layer 12 can also be seen.

Advantageously, the optical scanner comprises visible light sensors at two or more axially identical and diametrically different locations to compensate for lateral movement of the pipe.

Advantageously, the visible light sensor or each visible light sensor is provided with an associated light source, preferably a laser light source, configured to project light onto the surface of the pipe such that the visible light sensor is able to gather and record light reflected by the pipe surface from the associated light source.

According to the second aspect of the invention, a layer of already-wound tape is scanned by the scanning device. In other words, the scanning device is located after the winding applicator in the direction of conveyance of the pipe.

As already discussed, in manufacturing the composite pipe, the windings of the composite tape are heated to melt and fuse them to the underlying surface, be it the pipe liner, in the case of the first concentric layer of tape, or the underlying concentric layer of composite tape, in the case of subsequent concentric layers of tape. A heating device is provided to achieve this, the details of which are known to the skilled person.

BRIEF DESCRIPTION OF THE DRAWINGS

The invention will now be further described, by way of example only, and with reference to the accompanying drawings, in which:

As shown in FIG. 1, pipe 1 disposed on reel 2 is uncoiled and conveyed in conveyance direction 4 to be coiled onto a driven reel 3. In reality, the apparatus may be up to several hundred metres in length. Disposed between reel 2 and driven reel 3 is a winding applicator 5 disposed on rotating ring 6 through which pipe 1 passes. The winding applicator 5 applies composite tape 7 to the pipe 1 at location 8. A scanning device 9 located after winding applicator 5 scans a layer of wound composite tape to generate scanning information.

Figure 1:
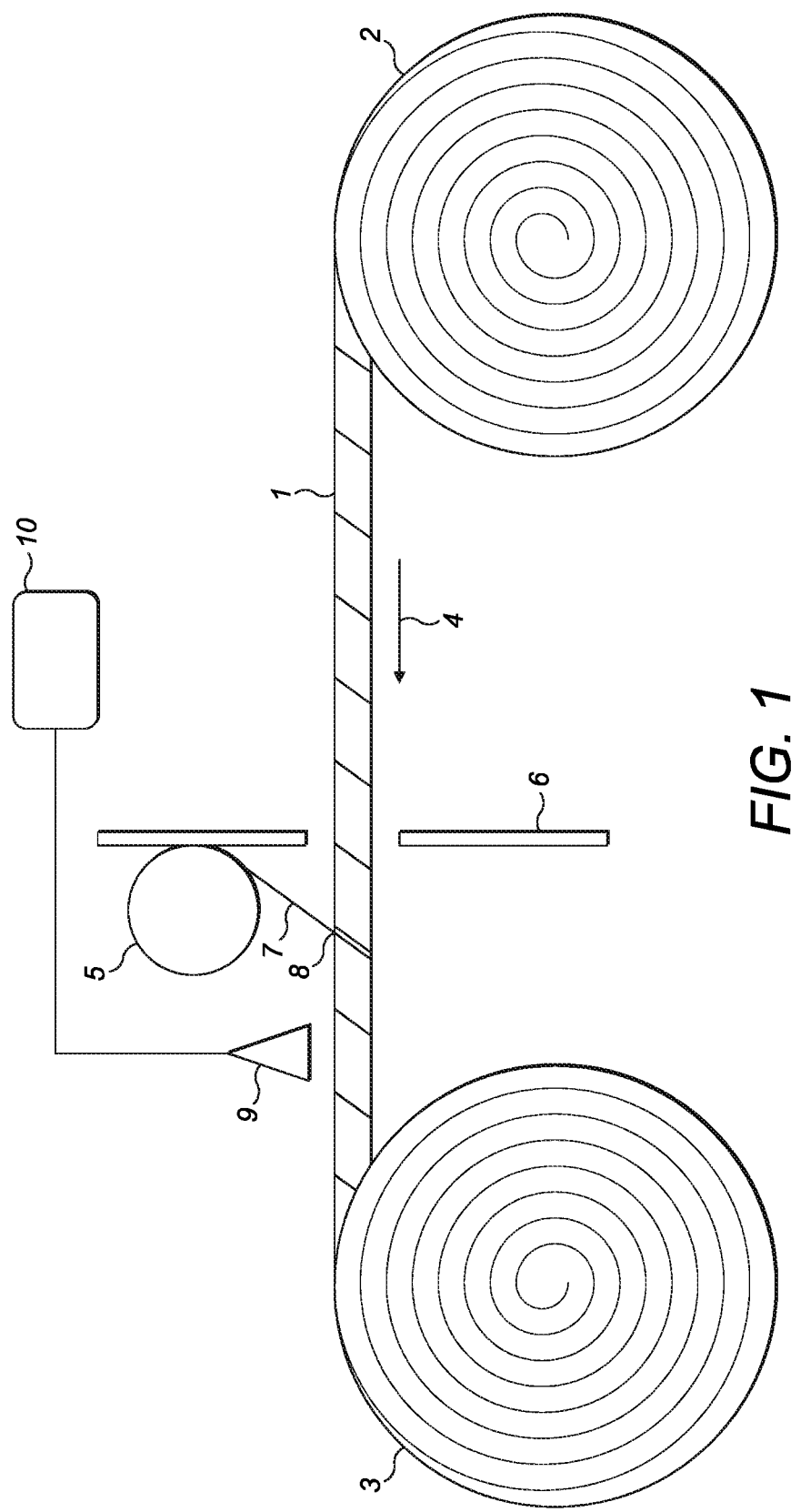
FIG. 1 is a schematic drawing illustrating the method and apparatus of the present invention.
Figure 2:
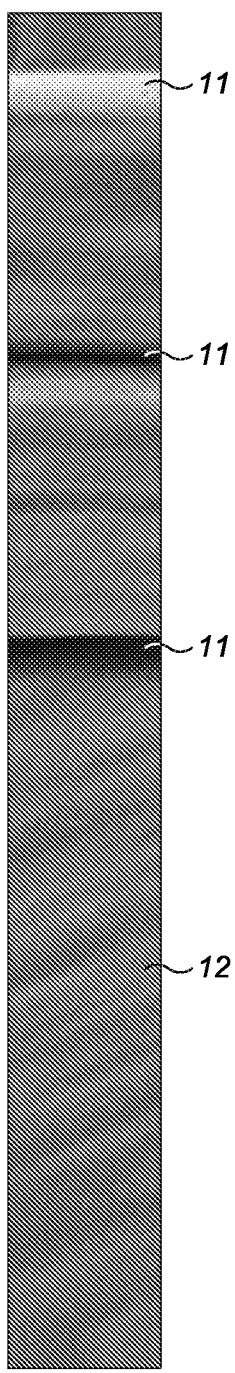
FIG. 2 is a two-dimensional surface map of a pipe surface generated with a profile sensor.

The scanning device 9 is linked via a control line to processor 10. Processor 10 receives the scanning information gained from scanning device 9 to determine wound composite tape edge position(s) and, using the determined wound composite tape edge position(s), it locate gap(s) between adjacent windings and determines the number of gaps and characteristic dimensions of each gap. It then generates a calculated void volume of the layer, using the number of gaps and the characteristic dimensions of each gap for the layer. Processor 10 also generates a calculated void volume for each further concentric layer and sums the calculated void volumes for each individual layer in order to generate a calculated void volume for the entire composite pipe.

The invention claimed is:

1. A method of determining a void volume during manufacture of a composite pipe formed of concentric layers of adjacently positioned, helical windings of composite tape, comprising the steps of:
   (a) scanning the surface of a layer of adjacently positioned, helical windings to generate scanning information;
   (b) using the scanning information to locate gap(s) between adjacent windings and to determine the number of gaps and characteristic dimensions of each gap in the layer; and
   (c) generating a calculated void volume of the layer, using the number of gaps and the characteristic dimensions of each gap for the layer.

2. The method of claim 1, whereby steps (a) to (c) are performed for every concentric layer of the composite pipe and the calculated void volumes of all layers are added together to generate a calculated void volume for the entire composite pipe.

3. The method of claim 1, wherein the step of scanning comprises an optical method, an electrical method, a magnetic method, a tactile method, an ultrasonic method, or a mixture thereof.

4. The method of claim 3, wherein the step of scanning comprises an optical method and the optical method comprises the steps of:
   projecting light, onto the region of the pipe surface where composite tape edges are expected to be;
   gathering and recording optical information from light reflected by the region where wound composite tape edges are expected to be;
   wherein the optical information is the scanning information used to locate gap(s) between adjacent windings and to determine the number of gaps and characteristic dimensions of each gap.

5. The method of claim 4, wherein the light is a laser light.

6. The method of claim 1, wherein step (a) is performed simultaneously at two or more axially identical and diametrically different locations to compensate for lateral movement of the pipe.

7. The method of claim 1, wherein step (a) is performed during rewinding of the pipe prior to application of further layer(s) of adjacently positioned, helical windings.

8. An apparatus for determining a void volume during manufacture of a composite pipe formed of concentric layers of helically wound composite tape, comprises:
   (a) a scanning device adapted to scan the surface of a layer of adjacently positioned, helical windings to generate scanning information;
   (b) a processor adapted to:
      (1) use the scanning information to locate gap(s) between adjacent windings and to determine the number of gaps and characteristic dimensions of each gap in the layer;
      (2) generate a calculated void volume of the layer, using the number of gaps and the characteristic dimensions of each gap for the layer.

9. The apparatus of claim 8, wherein the processor is additionally adapted to add together the calculated void volumes of all the layers to generate a calculated void volume for the entire composite pipe.

10. The apparatus of claim 8, wherein the scanning device comprises an optical scanner, an electrical scanner, a magnetic scanner, a tactile scanner, an ultrasonic scanner, or a mixture thereof.

11. The apparatus of claim 10, wherein the scanner is an optical scanner which comprises a visible light sensor for receiving reflected light from the pipe surface.

12. The apparatus of claim 11, comprising visible light sensors at two or more axially identical and diametrically different locations to compensate for lateral movement of the pipe.

13. The apparatus of claim 11, wherein the visible light sensor is provided with an associated light source configured to project light onto the surface of the pipe such that the visible light sensor is able to gather and record light reflected by the pipe surface from the associated light source.

14. The method of claim 2, wherein the step of scanning comprises an optical method, an electrical method, a magnetic method, a tactile method, an ultrasonic method, or a mixture thereof.

15. The method of claim 14, wherein the step of scanning comprises an optical method and the optical method comprises the steps of:
   projecting light onto the region of the pipe surface where composite tape edges are expected to be;
   gathering and recording optical information from light reflected by the region where wound composite tape edges are expected to be;
   wherein the optical information is the scanning information used to locate gap(s) between adjacent windings and to determine the number of gaps and characteristic dimensions of each gap.

16. The method of claim 15, wherein the light is a laser light.

17. The apparatus of claim 9, wherein the scanning device comprises an optical scanner, an electrical scanner, a magnetic scanner, a tactile scanner, an ultrasonic scanner, or a mixture thereof.

18. The apparatus of claim 17, wherein the scanner is an optical scanner which comprises a visible light sensor for receiving reflected light from the pipe surface.

19. The apparatus of claim 18, comprising visible light sensors at two or more axially identical and diametrically different locations to compensate for lateral movement of the pipe.

20. The apparatus of claim 19, wherein each visible light sensor is provided with an associated light source configured to project light onto the surface of the pipe such that each visible light sensor is able to gather and record light reflected by the pipe surface from the associated light source.

* * * * *